Jan. 16, 1968 T. GASSINO 3,363,837

MECHANICAL STORING DEVICE FOR STORING INFORMATION
CODED ACCORDING TO A BINARY CODE

Filed Feb. 2, 1967

INVENTOR.
TERESIO GASSINO

BY John Toggenburger
AGENT 3,363,837

MECHANICAL STORING DEVICE FOR STORING INFORMATION CODED ACCORDING TO A BINARY CODE

Teresio Gassino, Ivrea, Italy, assignor to Ing. C. Olivetti & C., S.p.A., Ivrea, Italy, a corporation of Italy Filed Feb. 2, 1967, Ser. No. 613,629
Claims priority, application Italy, Feb. 9, 1966, 32,176/66
2 Claims. (Cl. 235—123)

ABSTRACT OF THE DISCLOSURE

A mechanical storing device for storing information coded according to a binary code comprises a plurality of balls arranged in rows and columns and each one adapted to assume one of a pair of positions to represent a corresponding code unit, and a plurality of cells, each one comprising a pair of end portions to alternately house a corresponding one of said balls according to the code unit to be represented, each cell having at least one open side facing both said portions to enable a sensing device to simultaneously sense in each cell both said portions.

*Background of the invention*

This invention relates to a mechanical storing device for a storing information coded according to a binary code, comprising a plurality of elements arranged in rows and columns and each one adapted to assume one of a pair of positions to represent a corresponding code unit.

Mechanical storing device of the above type are already known. In a known storing device each code unit is stored by a ball selectively housed in a corresponding radial notch of one of a pair of disks. The notches of one of said disks may be mechanically sensed whereas the notches of the other disk merely represent the rest position of the ball.

In another known storing device the balls are housed in individual cells provided on two plates, which are mutually shiftable to allow the balls to move from one to the other plate. Also in this storing device the cell of one of said plates may be mechanically sensed, whereas the cell of the other plate represent the rest position of the balls. Said known storing devices require a very expensive set up device and are not reliable in the sensing operation, because the presence or absence of a ball in a cell is not checked by the absence, respectively the presence, of the ball in the corresponding rest cell.

*Summary of the invention*

These and other disadvantages are obviated by the mechanical storing device according to the invention, which is characterized by a plurality of cells, each one comprising a pair of end portions to alternately house a corresponding one of said elements according to the code unit to be represented, each cell having at least one open side facing both said portions, a sensing device being adapted to simultaneous sense in each cell both said portions.

This and other characteristics of the invention will become apparent from the following description of a preferred embodiment thereof and from the accompanying drawing.

*Description of the preferred embodiments of the invention*

Figure 1:
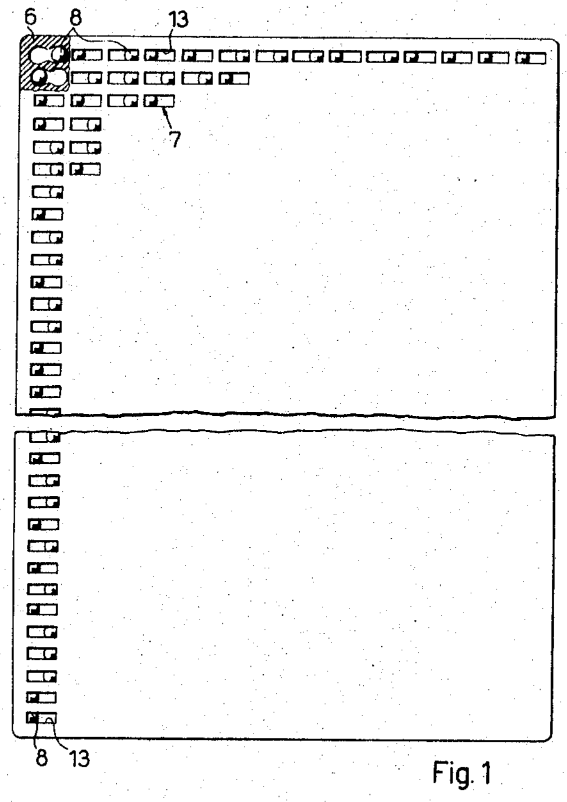
FIGURE 1 represents a mechanical storing device according to the invention.

With reference to FIGURE 1, the mechanical storing device comprises an elastic plate 6 made with rubber or like elastic material and having a rectangular shape. The plate 6 is provided with a plurality of cells 7 arranged on rows and columns, each row comprising fourteen cells 7 to represent one or more data coded according to a binary code.

Figure 4:
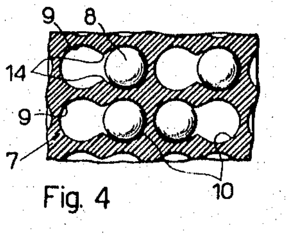
FIGURE 4 is a sectional view taken according to line IV—IV of the FIGURE 3.

Each cell is in form of a cylinder having a substantially 8-shaped section and is adapted to accommodate a corresponding element or ball 8. More particularly, each cell 7 comprises a pair of circular end portions 9 and 10 (FIGURE 4) having substantially the same diameter of the balls 8. The two portions 9 and 10 are adapted to alternately house one ball 8 which thus is adapted to assume one of a pair of positions to represent a corresponding code unit. Each cell 7 is also formed with a central portion 14 located between the two end portions 9 and 10 and forming a passage for the ball 8 slightly narrower than the diameter of the ball 8. The central portion 14 is thus adapted to prevent the ball 8 from freely passing from one to the other end portion 9, 10.

Figure 2:
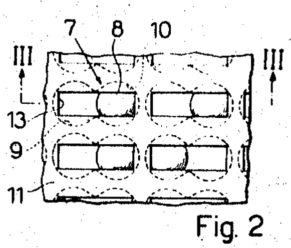
FIGURE 2 is a detail of the storing device on enlarged scale.
Figure 3:
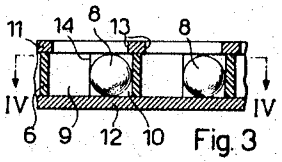
FIGURE 3 is a sectional view taken according to line III—III of the FIGURE 2.

The plate 6 (FIGURE 3) is supported by a pair of sheets 11 and 12 made with a rigid material, for example metallic material. The plate 11 is provided with a set of rectangular slots 13 (FIGURES 1 and 2) each one facing a corresponding cell 7. Each slot 13 is narrower than the diameter of the ball 8 to prevent this latter from leaving the cell 6. However the ball 8 may be set and sensed through the corresponding slot 13. It is thus clear that each cell 7 is provided at least with an open side and that the two portions 9 and 10 thereof are both facing the opening 13.

The ball 8 of each cell 7 may be set up into one or the other of the two end portions 9 and 10 by forcing it through the central portion 14, for example by means of a pointed tool or merely by means of the tip of a pencil. Nevertheless the ball may be set up also automatically in any known manner.

The storing device so set may be used for example as a removable program for an accounting or like office machine, or for storing constant numerical data for data processing equipments in general.

Each element of the storing device may be sensed by a sensing device comprising a pair of sensing members 15 and 16 (FIGURE 5) located in front of each slot 13 of a row of cell 7 and associated with the two portions 9 and 10 of the cell 7. The sensing members 15 and 16 are fulcrumed on two pivots 17 and 18 respectively, carried by a swing lever 19 and their lower end is guided by notches provided on a stationary comb plate 20. The swing lever 19 is pivoted on a pivot 21 carried on a lever 22, which in turn is rotatably mounted on a stationary pivot 23 and is normally urged by a spring 24 to contact a cam 25. This latter is secured to a shaft 26 adapted to be cyclically rotated counterclockwise in a known manner. Finally the swing lever 19 is provided with a notch 27 engaging a pin 28 of a slide 29 adapted to generate a signal corresponding to the sensed code unit. The slide 29 is adapted to follow the swing lever 19 when displaced vertically in a manner known per se.

Figure 5:
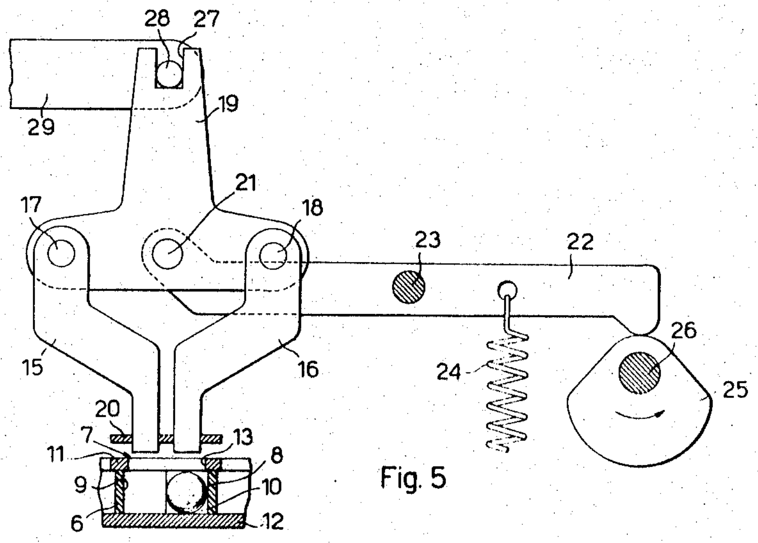
FIGURE 5 is a partial view of a sensing device for the storing device of FIGURE 1.

When the shaft 26 is rotated counterclockwise, the cam 25 rocks the lever 22 counterclockwise. Consequently the lever 22 lowers the swing lever 19 together with the sensing members 15 and 16. These latter through the opening 13 sense the two portions 9 and 10 of the corresponding cell 7. In the case the ball 8 is located in the portion 10, as shown in FIGURE 5, the sensing member is arrested by the ball 8, whereas the sensing member 15 is additionally lowered to approach the plate 12. The swing lever 19 is thus rocked counterclockwise on the pin 21 and displaces the slide 29 leftwards.

Similarly, in the case the ball 8 is located in the portion 9 of the cell 7, when the lever 22 is rocked counterclockwise, the sensing member 15 is arrested by the ball 8, whereas the sensing member 16 is additionally lowered to approach the plate 12. The swing lever 19 is now rocked clockwise and displaces the slide 29 rightwards.

It is thus clear that the storing device is provided with a plurality of cells 7, each one comprising a pair of end portions 9 and 10 adapted to alternately house a corresponding one of elements or balls 8, according to the code unit to be represented, said cell 7 having at least one open side 13 facing both said portions 9 and 10, a sensing device being adapted to simultaneously sense in each cell both said portions, thus avoiding errors due to wrong or incomplete positioning of the balls 8, or due merely to the missing of the ball.

It is understood that many changes, improvements and additions of parts may be made to the described storing device or to the sensing device without departing from the scope of the invention. For example the balls may be replaced by rolls or like.

What I claim is:

1. A mechanical storing device for storing information coded according to a binary code, comprising a plurality of rigid balls arranged in rows and columns and each one adapted to assume one of a pair of positions to represent a corresponding code unit, a plurality of cylindrical cells associated with said balls, each one of said cells comprising a pair of end portions to alternately house a corresponding one of said balls according to the code unit to be represented and a central portion forming a passage slightly narrower than the diameter of said balls, each cell having at least one open side facing both said portions, at least a pair of sensing members adapted to simultaneously sense in one of said cells both said end portions, a swing lever pivotally mounting at each end thereof one of said sensing members, and a positively power operated pivot member for said sensing members.

2. A mechanical storing device according to claim 1, comprising a plate made with an elastic material carrying said cells, and comprising further by a pair of sheets made of a rigid material for supporting said plate, said sheets being located at mutually opposite sides with respect to said plate, one of said sheets being provided with a rectangular slot facing each one of said cells.

References Cited

UNITED STATES PATENTS

| | | | |
|---|---|---|---|
| 3,024,976 | 3/1962 | Wales | 235—61 |
| 3,270,958 | 9/1966 | Hickerson | 235—61 |

OTHER REFERENCES

IBM Tech. Disclosure Bulletin, vol. 8, No. 3, August 1965.

IBM Tech. Disclosure Bulletin, vol. 6, No. 3, August 1963.

RICHARD B. WILKINSON, *Primary Examiner.*

STANLEY A. WAL, *Assistant Examiner.*